(Model.)

I. E. RICKETTS.
AXLE SKEIN.

No. 243,974. Patented July 5, 1881.

WITNESSES:
C. Neveux
E. Sedgwick

INVENTOR:
I. E. Ricketts
BY Munn & Co
ATTORNEYS.

UNITED STATES PATENT OFFICE.

ISAAC E. RICKETTS, OF GARNETT, KANSAS.

AXLE-SKEIN.

SPECIFICATION forming part of Letters Patent No. 243,974, dated July 5, 1881.

Application filed December 20, 1880. (Model.)

*To all whom it may concern:*

Be it known that I, ISAAC E. RICKETTS, of Garnett, Anderson county, Kansas, have invented a new and Improved Axle-Thimble, of which the following is a specification.

The object of this invention is to provide a device whereby the friction of the wheel-hub on the axle-thimble shall be greatly reduced, so that the wheel will run easier and the thimble endure longer.

The invention consists of an axle-thimble provided with several annular grooves, in which are fitted rings that serve as revolving bearings for the wheel.

Figure 1:
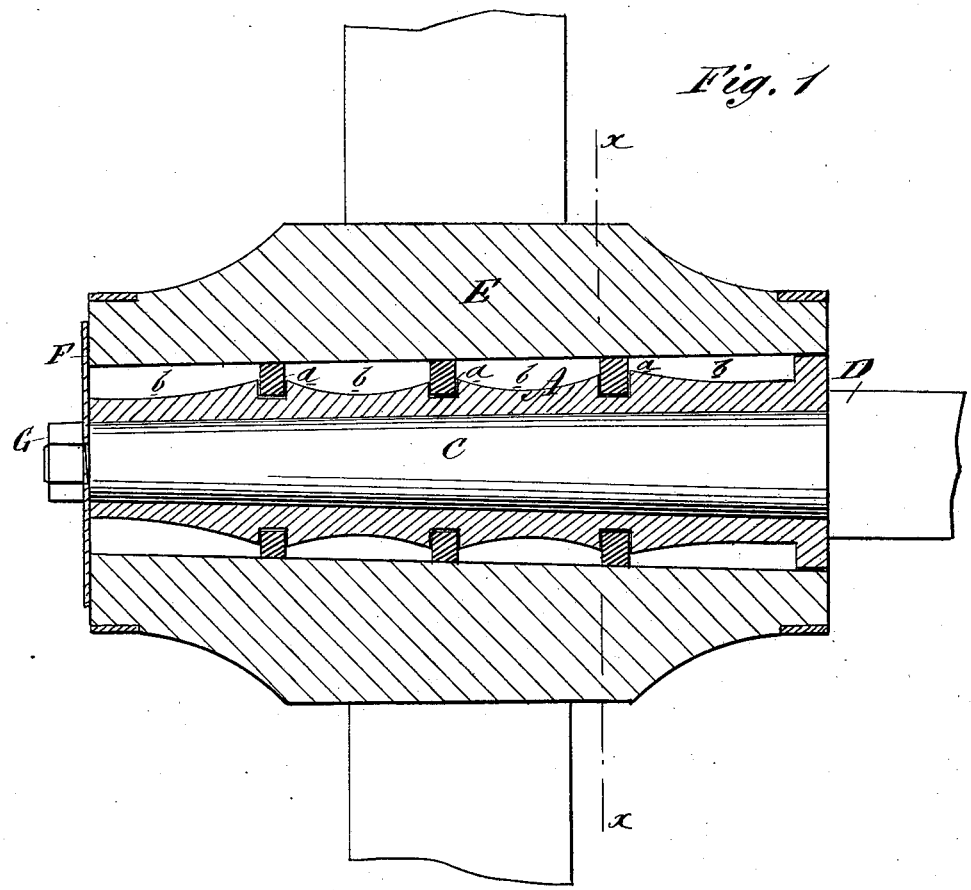
Figure 2:
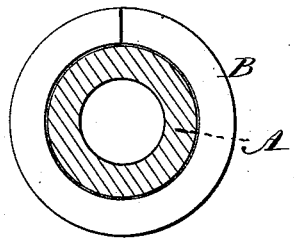

Figure 1 is a sectional side elevation of the device in position in a wheel. Fig. 2 is a cross-section of the same on the line $x\ x$, Fig. 1.

Similar letters of reference indicate corresponding parts.

In the drawings, A represents the axle-thimble, having annular grooves $a\ a$, while between said grooves $a\ a$ said thimble A is turned down, as shown at $b\ b$, into concavities that facilitate the lubrication of said thimble A.

B B represent the rings or travelers, fitted into grooves $a\ a$. These travelers or rings B B can be applied while hot in the form of open rings, and then closed; or when applied to iron spindle they can be cast on the said spindle, so that they shall be loose and revolve under pressure of the wheel.

The metallic thimbles A are designed only for wooden axle-spindles, to give them increased strength and endurance. They are not required or used on iron axles.

C represents the spindle of the axle D, on which spindle C the thimble A is held in the usual manner.

E represents a wheel, set on the thimble A, and having its hub bearing only on the rings or travelers B B, as shown.

F represents the washer, and G the nut whereby the said wheel E is held in place on said thimble A.

The rings or travelers B B revolve with the rotation of the wheel E, and consequently serve as anti-frictional bearings for the same.

It is designed to slightly bevel the peripheries of the travelers B B to correspond with the slant or gathering of the spindle C. These travelers B B are designed to be inserted about a quarter of an inch in the grooves $a\ a$ of a wagon-thimble, and to project therefrom about an eighth of an inch, while on a thimble of a lighter vehicle they will be about an eighth of an inch in the grooves $a\ a$ and about as much above them.

Having thus described my invention, I claim as new and desire to secure by Letters Patent—

As an improved article of manufacture, an axle-thimble constructed substantially as herein shown and described, consisting of thimble A, provided with annular grooves $a\ a$, containing rings or travelers B B, as set forth.

ISAAC EVANS RICKETTS.

Witnesses:
JACOB BRONSTON,
L. HENDRICKSON.